United States Patent
Yu et al.

(10) Patent No.: US 12,348,047 B2
(45) Date of Patent: Jul. 1, 2025

(54) PHOTOVOLTAIC SYSTEM AND CARRIER WAVE SIGNAL SYNCHRONIZATION METHOD

(71) Applicant: Huawei Digital Power Technologies Co., Ltd., Shenzhen (CN)

(72) Inventors: Xinyu Yu, Shanghai (CN); Peng Dong, Shanghai (CN); Kai Xin, Shanghai (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/526,340

(22) Filed: Dec. 1, 2023

(65) Prior Publication Data

US 2024/0106244 A1    Mar. 28, 2024

Related U.S. Application Data

(63) Continuation of application No. PCT/CN2021/098426, filed on Jun. 4, 2021.

(51) Int. Cl.
 *H02J 3/40* (2006.01)
 *H02J 3/38* (2006.01)
 *H02M 7/493* (2007.01)

(52) U.S. Cl.
 CPC .............. *H02J 3/40* (2013.01); *H02J 3/381* (2013.01); *H02M 7/493* (2013.01); *H02J 2300/24* (2020.01)

(58) Field of Classification Search
 CPC ...... H02J 3/40; H02J 3/38; H02J 3/381; H02J 2300/24; H02M 7/493
 See application file for complete search history.

(56) References Cited

FOREIGN PATENT DOCUMENTS

| | | |
|---|---|---|
| CN | 104065287 A | 9/2014 |
| CN | 104218836 A | 12/2014 |
| CN | 105515034 B | 5/2018 |
| CN | 108377002 A | 8/2018 |
| CN | 208094207 U | 11/2018 |
| CN | 110098635 A | 8/2019 |
| CN | 110679074 B | 12/2020 |
| EP | 3691104 A1 | 8/2020 |
| KR | 102169390 B1 | 10/2020 |

*Primary Examiner* — Robert L Deberadinis
(74) *Attorney, Agent, or Firm* — Slater Matsil, LLP

(57) ABSTRACT

This application discloses a photovoltaic system and a carrier wave signal synchronization method. The photovoltaic system includes a plurality of inverters and a controller. Each inverter in the photovoltaic system inverts a direct current into an alternating current based on a received carrier wave signal, and transmits the alternating current to a power grid. The controller obtains first output currents of the plurality of inverters in an adjustment period, so that the controller can obtain first output current valid values of the plurality of inverters based on the first output currents of the plurality of inverters.

19 Claims, 6 Drawing Sheets

PHOTOVOLTAIC SYSTEM AND CARRIER WAVE SIGNAL SYNCHRONIZATION METHOD

CROSS-REFERENCE TO RELATED APPLICATIONS

This application is a continuation of International Application No. PCT/CN2021/098426, filed on Jun. 4, 2021, the disclosure of which is hereby incorporated by reference in its entirety.

TECHNICAL FIELD

This application relates to the electronic power field, and in particular, to a photovoltaic system and a carrier wave signal synchronization method.

BACKGROUND

An inverter in a photovoltaic system is a key apparatus for converting a direct current generated by a direct current combiner box into an alternating current. In the photovoltaic system, a plurality of inverters are usually connected in series or in parallel to increase a power capacity, so as to perform transmission at a higher power.

To make a waveform of an alternating current voltage output by an inverter approximate to a sine wave to achieve excellent working performance, the inverter is usually controlled through sinusoidal pulse width modulation (SPWM). Controlling the inverter is essentially controlling a status of a switch component in the inverter.

In a sinusoidal pulse width modulation method, a sine wave may be used as a modulated wave signal, and an isosceles triangular wave may be used as a carrier wave signal. When the modulated wave signal intersects with the carrier wave signal, an intersection point of the signals determines on/off of the switch component in the inverter. Therefore, when a plurality of inverters are connected in series or in parallel in the photovoltaic system, if carrier wave signals of the inverters are not completely synchronized, a circulation current is generated on the plurality of inverters. FIG. 1 is a schematic diagram of a flow direction of a circulation current generated on a plurality of inverters. The following problems are likely to occur when a circulation current is generated on a plurality of inverters.
1. A loss of a component or an element in a photovoltaic system increases, and a life and reliability of the component or the element are affected.
2. A current peak is likely to occur, and this may cause overcurrent protection of an inverter.
3. A circulation current is a common-mode current, and a leakage current detected by the inverter may be excessively large, resulting in false protection for the leakage current.

Currently, there may be the following methods for suppressing a circulation current.

One method is separately connecting positive buses and negative buses of a plurality of inverters in a photovoltaic system in parallel, to ensure that bus voltages are consistent. However, in a connection manner through a hardware cable, a plurality of additional direct current parallel cables need to be added, which increases costs.

Another method is adjusting a direct current bus voltage by detecting direct current bus voltages of different inverters. However, this method belongs to open-loop control. Therefore, when there is a slight difference in sampling of direct current bus voltages of different inverters, a large circulation current is still formed. Carrier wave synchronization performed by detecting the direct current bus voltages of the different inverters depends on power grid voltage sampling. When an error of the power grid voltage sampling is large, a carrier wave synchronization error is also large.

In view of this, how to perform carrier wave signal synchronization on a plurality of inverters in a photovoltaic system without changing the existing photovoltaic system to implement closed-loop suppression for a circulation current is a problem to be urgently resolved by a person skilled in the art.

SUMMARY

This application provides a photovoltaic system and a carrier wave signal synchronization method, to perform carrier wave signal synchronization on a plurality of inverters in a photovoltaic system without changing the existing photovoltaic system, so as to implement closed-loop suppression for a circulation current.

According to a first aspect, this application provides a photovoltaic system. The photovoltaic system includes a plurality of inverters and a controller. Each inverter is configured to: invert a direct current into an alternating current based on a received carrier wave signal, and transmit the alternating current to a power grid. The controller is configured to: obtain first output currents of the plurality of inverters in an adjustment period, where a first output current of any inverter is obtained by sampling an output current of the inverter at a specified sampling frequency, and the specified sampling frequency is greater than a frequency of a carrier wave signal of the inverter; obtain first output current valid values of the plurality of inverters based on the first output currents of the plurality of inverters; and adjust a phase of a carrier wave signal of a first target inverter, where the first target inverter is an inverter with a largest first output current valid value in the plurality of inverters.

According to the controller in the photovoltaic system, the controller determines the inverter with the largest first output current valid value in the inverters as the first target inverter, and then can adjust the phase of the carrier wave signal corresponding to the first target inverter, so that a phase of an inverter with a largest circulation current can be adjusted. Finally, closed-loop suppression for a circulation current in the photovoltaic system can be implemented, a loss of an inverter can be reduced, and reliability of the photovoltaic system can be improved.

To further simplify a carrier wave signal adjustment step, in some possible implementations, the controller is specifically configured to shift the carrier wave signal of the first target inverter toward a first direction by a specified phase angle. The first direction may be a direction prior to the phase of the original carrier wave signal, or a direction lagging behind the phase of the original carrier wave signal, and the specified phase angle may be a value of a fixed phase angle or a fixed phase angle proportion.

To ensure that a circulation current of the first target inverter decreases after shifting by the specified phase angle, in a possible implementation, the controller is further configured to: perform at least one time of phase correction on the carrier wave signal of the first target inverter after shifting the carrier wave signal of the first target inverter toward the first direction by the specified phase angle, where any time of phase correction includes: obtaining second output currents of the plurality of inverters, where a second output current of any inverter is obtained by sampling the output current of the inverter at the specified sampling frequency; obtaining second output current valid values of the plurality of inverters based on the second output currents of the plurality of inverters; and when a second target inverter is the same as the first target inverter, if a second output current valid value of the first target inverter is greater than or equal to the first output current valid value of the first target inverter, shifting the carrier wave signal of the first target inverter toward a second direction by the specified phase angle, where the second direction is an opposite direction of the first direction; or if a second output current valid value of the first target inverter is less than the first output current valid value of the first target inverter, continuing to shift the carrier wave signal of the first target inverter toward the first direction by the specified phase angle. Whether the first direction for the shift by the phase angle is correct is learned by determining a value relationship between the first output current valid value of the first target inverter and the second output current valid value of the first target inverter through comparison.

To obtain a circulation current of the first target inverter, in some possible implementations, the photovoltaic system includes a plurality of current detection circuits, the plurality of current detection circuits are in a one-to-one correspondence with the plurality of inverters, and each current detection circuit is coupled to a corresponding inverter. A current detection circuit corresponding to any inverter is configured to sample the output current of the inverter at the specified sampling frequency in the adjustment period, to obtain the first output current of the inverter. When obtaining the first output currents of the plurality of inverters, the controller is specifically configured to obtain the first output currents that are of the plurality of inverters and that are sampled by the plurality of current detection circuits. An output cable current of the inverter is detected according to an electromagnetic mutual inductance principle. In addition, after obtaining the output cable current, the current detection circuit further needs to perform filtering processing on the output cable current, to obtain a high-frequency circulation current component, so as to finally determine the first output current. Optionally, the current detection circuit may extract the high-frequency circulation current component in the output cable current through hardware filtering, software filtering, or the like.

In some possible implementations, the controller is further configured to: generate a carrier wave signal of each inverter based on a power grid voltage; and send the carrier wave signal of each inverter to the corresponding inverter. An initial phase of the carrier wave signal is determined based on a zero-crossing point or a phase value of the power grid voltage, and the carrier wave signal corresponding to each inverter is generated based on the initial phase of the carrier wave signal.

In some possible implementations, when generating the carrier wave signal of each inverter based on the power grid voltage, the controller is specifically configured to: determine an initial phase of the carrier wave signal based on a zero-crossing point or a phase value of the power grid voltage; and generate, based on the initial phase of the carrier wave signal, the carrier wave signal corresponding to each inverter. In a phase locking manner, a frequency of the power grid voltage may be followed, to determine when the power grid voltage crosses zero. After determining the zero-crossing point of the power grid voltage, the controller generates the carrier wave signal by using the zero-crossing point of the power grid voltage as a start phase. Alternatively, a phase of the power grid voltage may be detected, and when determining that the phase of the power grid voltage is $\pi$ or $2\pi$, the controller generates carrier wave signals of the plurality of inverters by using a determining moment as a start phase.

According to a second aspect, this application provides a carrier wave signal synchronization method, applied to a controller in a photovoltaic system. The photovoltaic system further includes a plurality of inverters, and each inverter is configured to: invert a direct current into an alternating current based on a received carrier wave signal, and transmit the alternating current to a power grid. The method includes: obtaining first output currents of the plurality of inverters in an adjustment period, where a first output current of any inverter is obtained by sampling an output current of the inverter at a specified sampling frequency, and the specified sampling frequency is greater than a frequency of a carrier wave signal of the inverter; obtaining first output current valid values of the plurality of inverters based on the first output currents of the plurality of inverters; and adjusting a phase of a carrier wave signal of a first target inverter, where the first target inverter is an inverter with a largest first output current valid value in the plurality of inverters.

In some possible implementations, the adjusting a phase of a carrier wave signal of a first target inverter includes: shifting the carrier wave signal of the first target inverter toward a first direction by a specified phase angle.

In some possible implementations, the method further includes: performing at least one time of phase correction on the carrier wave signal of the first target inverter after shifting the carrier wave signal of the first target inverter toward the first direction by the specified phase angle, where any time of phase correction includes: obtaining second output currents of the plurality of inverters, where a second output current of any inverter is obtained by sampling the output current of the inverter at the specified sampling frequency; obtaining second output current valid values of the plurality of inverters based on the second output currents of the plurality of inverters; and when a second target inverter is the same as the first target inverter, if a second output current valid value of the first target inverter is greater than or equal to the first output current valid value of the first target inverter, shifting the carrier wave signal of the first target inverter toward a second direction by the specified phase angle, where the second target inverter is an inverter with a largest second output current valid value in the plurality of inverters, and the second direction is an opposite direction of the first direction; or if a second output current valid value of the first target inverter is less than the first output current valid value of the first target inverter, continuing to shift the carrier wave signal of the first target inverter toward the first direction by the specified phase angle.

In some possible implementations, the photovoltaic system further includes a plurality of current detection circuits, the plurality of current detection circuits are in a one-to-one correspondence with the plurality of inverters, and each current detection circuit is coupled to a corresponding inverter; and the obtaining first output currents of the plurality of inverters includes: obtaining the first output currents that are of the plurality of inverters and that are sampled by the plurality of current detection circuits.

In some possible implementations, the method further includes: generating a carrier wave signal of each inverter based on a power grid voltage; and sending the carrier wave signal of each inverter to the corresponding inverter.

In some possible implementations, the generating a carrier wave signal of each inverter based on a power grid voltage includes: determining an initial phase of the carrier wave signal based on a zero-crossing point or a phase value of the power grid voltage; and generating, based on the initial phase of the carrier wave signal, the carrier wave signal corresponding to each inverter.

These aspects or other aspects of this application are clearer and easier to understand in descriptions of the following embodiments.

DETAILED DESCRIPTION OF ILLUSTRATIVE EMBODIMENTS

Figure 1:
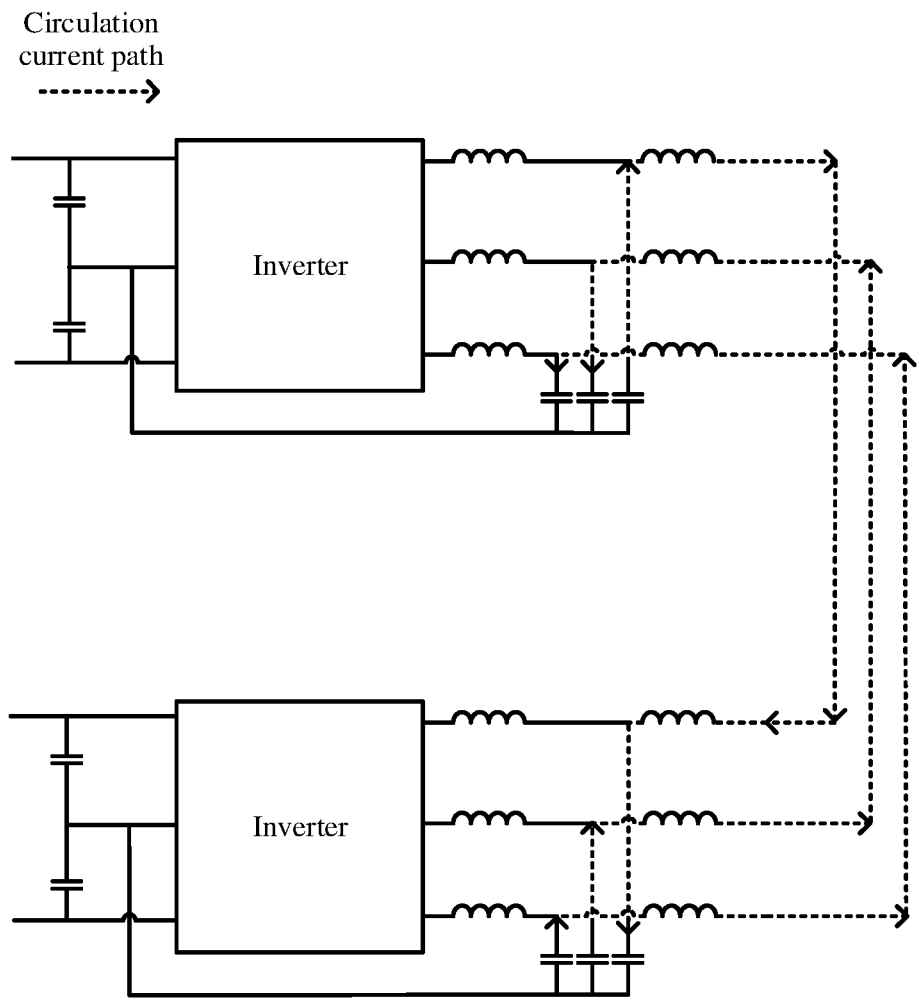
FIG. 1 is a schematic diagram of a flow direction of a circulation current generated on a plurality of inverters.

The following first describes some terms in embodiments of this application to help a person skilled in the art have a better understanding.

(1) Phase locking: is a method for making a phase of a controlled component controlled by a standard signal or an external signal. The phase locking method is used to implement phase synchronization, or is used to track a frequency or a phase of another signal.

(2) Circulation current: is a current flowing between a plurality of inverters. The current does not flow to load or a power grid, and therefore is referred to as a circulation current.

(3) Perturbation and observation method: is a method in which an output voltage of a photovoltaic array is perturbed, output powers of the photovoltaic array before and after perturbation are determined in a calculation manner in which a power is equal to a product of a voltage and a current, and then the two output powers before and after the perturbation are compared and observed. In this application, a phase angle of a carrier wave signal may be gradually changed by using the perturbation and observation method, to complete adjustment of a circulation current in a closed-loop manner.

(4) SPWM: is a PWM control method widely used currently. When narrow pulses with a same impulse but different shapes are applied to a link with inertia, generated functions and effects are basically the same. In SPWM, the foregoing conclusion is used as a theoretical basis, and an SPWM wave (which is a PWM wave whose pulse width changes according to a sine rule and that is equivalent to a sine wave, and may also be referred to as a modulated wave) is used to control on/off of a switch component in an inverter, so that an area of a pulse voltage output by the invert is equal to an area of a desired sine wave in a corresponding interval. In addition, a frequency and an amplitude of an output voltage of the inverter can be adjusted by changing a frequency and an amplitude of the SPWM wave.

It should be noted that in descriptions of this application, "at least one" means one or more, and "a plurality of" means two or more. In view of this, in embodiments of this application, "a plurality of" may also be understood as "at least two". The term "and/or" describes an association relationship of associated objects, and indicates that three relationships may exist. For example, A and/or B may indicate the following three cases: Only A exists, both A and B exist, and only B exists. In addition, the character "/" generally indicates an "or" relationship between the associated objects, unless otherwise stated. In addition, it should be understood that in the descriptions of this application, words such as "first" and "second" are merely used for distinguishing, and cannot be understood as an indication or implication of relative importance or an indication or implication of a sequence.

To make the objectives, technical solutions, and advantages of this application clearer, the following further describes this application in detail with reference to the accompanying drawings.

Figure 2:
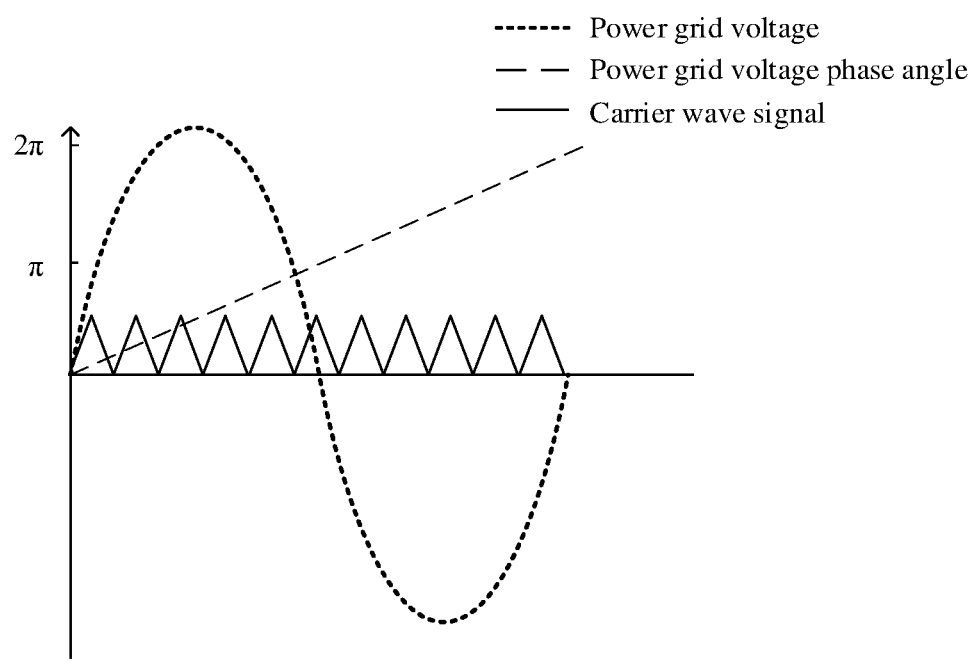
FIG. 2 is a schematic diagram of a waveform of carrier wave synchronization performed based on a power grid.

In some possible implementations, because a plurality of inverters in a photovoltaic system are connected to a power grid in series or in parallel, a controller in the photovoltaic system may detect a power grid voltage, to implement carrier wave signal synchronization of the plurality of inverters. Optionally, the plurality of inverters may sample the voltage of the power grid to which the plurality of inverters are connected, and then determine a zero-crossing point of the power grid voltage in a phase locking manner or a zero-crossing detection manner. After the zero-crossing point of the power grid voltage is determined, each inverter uses the zero-crossing point of the power grid voltage as a start phase, so that the controller starts counting from the start phase, to generate carrier wave signals of the plurality of inverters. In this way, the plurality of inverters connected in series or in parallel implement carrier wave signal synchronization of the plurality of inverters by detecting the power grid voltage. FIG. 2 is a schematic diagram of a waveform of carrier wave synchronization performed based on a power grid. As shown in FIG. 2, when a power grid voltage crosses zero, or a phase of a power grid voltage reaches a preset value, initial counting is performed on a carrier wave signal, so that carrier wave signal synchronization of a plurality of inverters can be implemented. However, in the foregoing manner, sampling of the power grid voltage is excessively depended on. When an error of sampling the power grid voltage by an inverter is large, a difference between carrier wave signals generated by the inverters is also large. Therefore, a large circulation current is still formed between the inverters. In view of this, how to implement closed-loop suppression for a circulation current without depending on sampling of a power grid voltage and without changing a photovoltaic system is a problem to be urgently resolved by a person skilled in the art.

Figure 3:
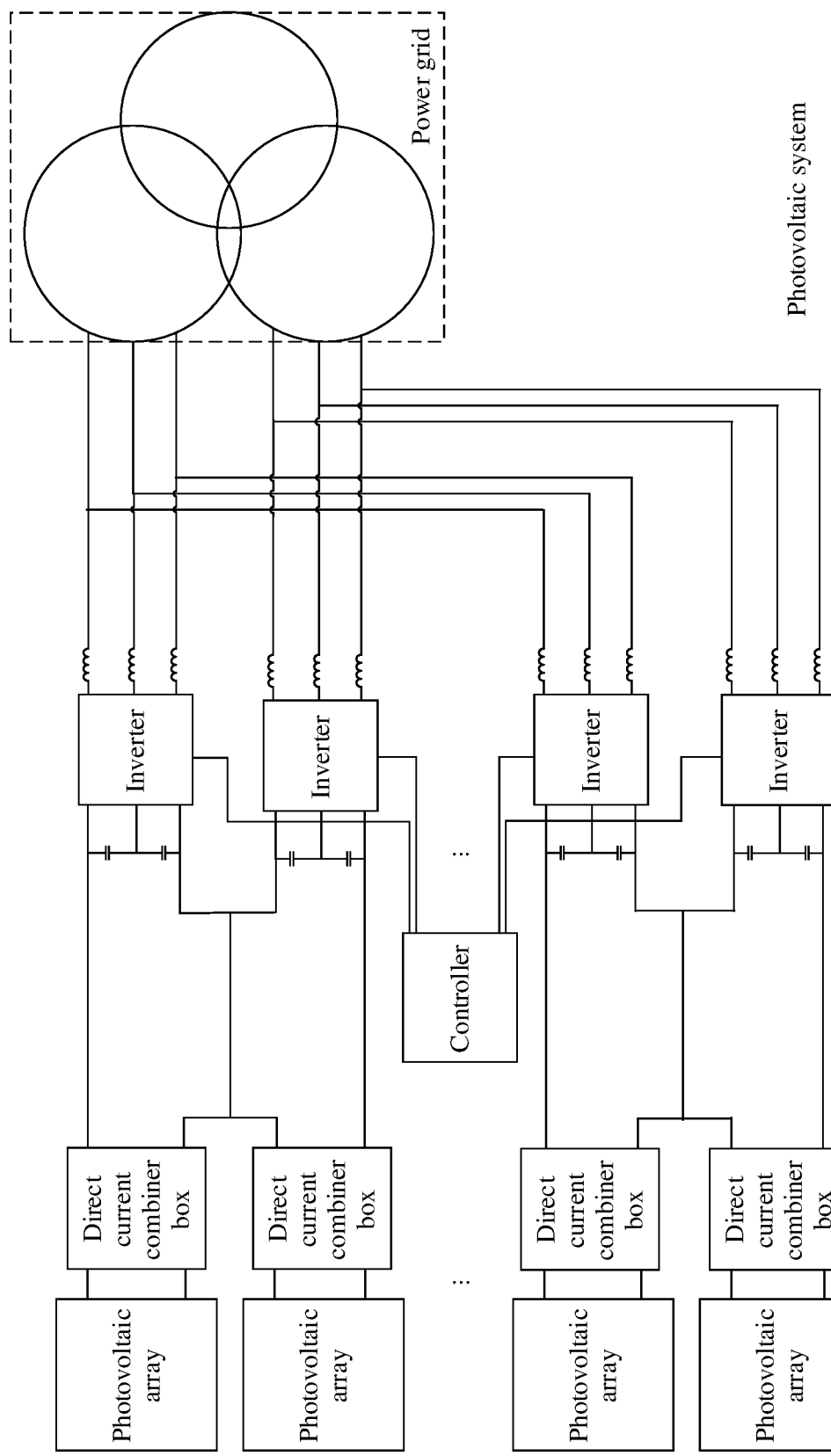
FIG. 3 is a schematic diagram of a structure of a photovoltaic system.

This application provides a photovoltaic system. As shown in FIG. 3, the photovoltaic system includes a plurality of inverters and a controller.

Each inverter is configured to: invert a direct current into an alternating current based on a received carrier wave signal, and transmit the alternating current to a power grid.

The controller is configured to:

obtain first output currents of the plurality of inverters in an adjustment period, where a first output current of any inverter is obtained by sampling an output current of the inverter at a specified sampling frequency, and the specified sampling frequency is greater than a frequency of a carrier wave signal of the inverter; and obtain first output current valid values of the plurality of inverters based on the first output currents of the plurality of inverters; and adjust a phase of a carrier wave signal of a first target inverter, where the first target inverter is an inverter with a largest first output current valid value in the plurality of inverters.

In this embodiment of this application, the adjustment period may be preset duration, or a time interval that is not fixed (for example, one adjustment period is used to adjust a carrier wave signal of one inverter). This is not limited in this application. For example, the controller in the photovoltaic system may obtain the first output currents of the plurality of inverters at a specified time interval, to obtain the first output current valid values of the plurality of inverters based on the first output currents of the plurality of inverters. The controller determines the inverter with the largest first output current valid value in the inverters as the first target inverter. In this way, phase adjustment can be performed on the carrier wave signal of the first target inverter in real time, to adjust a magnitude of an output current of each inverter, so that closed-loop suppression can be implemented for a circulation current in the photovoltaic system.

The controller may obtain the first output current valid values in a plurality of manners. For example, a sampling circuit is disposed in the photovoltaic system. When the inverter is a single-phase inverter, the sampling circuit may perform a plurality of times of sampling on a single-phase output of the single-phase inverter in a switching period of the inverter, to improve sampling precision. A sampling frequency of the plurality of times of sampling may be set to a specified sampling frequency, an average value of sampled currents obtained through the plurality of times of sampling is calculated, the average value of the sampled currents is used as the first output current, and then the first output current valid value is determined. Any method that can be used to perform circulation current sampling for an inverter may be applied to embodiments of this application. A person skilled in the art should know that this is not limited herein.

In addition, when the inverter is a three-phase (multi-phase) inverter, the sampling circuit may also perform a plurality of times of sampling on a three-phase output of the three-phase inverter in a switching period of the inverter, and calculate an average value of sampled currents obtained through the plurality of times of sampling, to obtain an average value of sampled currents corresponding to each phase in the three-phase inverter. The controller may select, from average values of sampled currents corresponding to all phases, a largest average value of sampled currents as the first output current, or the controller may calculate an intermediate value (or an average value) of the average values of the sampled currents corresponding to all the phases, use this parameter as the first output current, and then determine the first output current valid value.

Optionally, a manner of determining the first target inverter in this embodiment of this application may further include:
the controller selects, from the plurality of inverters, one inverter with the largest first output current valid value as the first target inverter; or
the controller selects, from the plurality of inverters, a plurality of inverters with larger first output current valid values as first target inverters; or
the controller selects, from the plurality of inverters, a plurality of inverters whose first output current valid values are greater than an average value of first output current valid values as first target inverters.

Optionally, the photovoltaic system may further include a photovoltaic array and a direct current combiner box. The photovoltaic array is configured to convert light energy into a direct current and output the direct current to the direct current combiner box. Each direct current combiner box may be connected to one or more photovoltaic arrays (one photovoltaic array is connected in a structure shown in FIG. 3), and is configured to: combine direct currents output by one photovoltaic array, and then transmit a combined current to a corresponding inverter connected to the direct current combiner box. The direct current combiner box can be used to reduce a power supply interruption range when the photovoltaic system is faulty. The photovoltaic array may include a specific quantity of photovoltaic components connected in series or in parallel. Optionally, the direct current combiner box may include a maximum power point tracking (MPPT) circuit, and the MPPT circuit may further control a maximum power point tracking point of the photovoltaic array, to increase an overall energy yield of the photovoltaic array and reduce overall costs of the photovoltaic system.

In this application, to increase a power capacity of an inverter, the plurality of inverters in this application may be connected in series or in parallel, to perform transmission at a higher power. However, to make a waveform of an alternating current voltage inverted by the inverter approximate to a sine wave to achieve excellent working performance, the inverter usually includes a plurality of full-controlled switch components. The full-controlled switch component in embodiments of this application may be one of a plurality of types of switching transistors such as a metal oxide semiconductor field effect transistor (MOSFET), a bipolar junction transistor (BJT), and an insulated gate bipolar transistor (IGBT). The full-controlled switch component may include a first electrode, a second electrode, and a control electrode. The control electrode is configured to control closing or opening of the switch component. When the switch component is closed, a current may be transmitted between the first electrode and the second electrode of the switch component. When the switch component is open, a current cannot be transmitted between the first electrode and the second electrode of the switch component.

Figure 4:
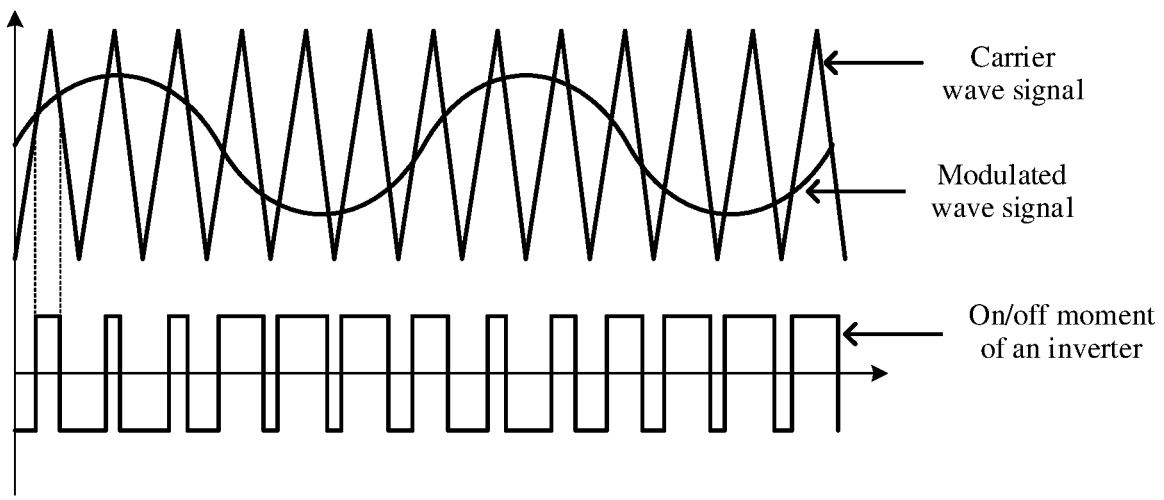
FIG. 4 is a schematic diagram of sinusoidal pulse width modulation.

In this application, the switch component in the inverter is controlled in an SPWM manner. Herein, a three-phase inverter is still used as an example. A voltage waveform of an alternating current output by a phase in the three-phase inverter is formed by repeatedly turning on and turning off a switch component in an upper (or lower) bridge arm of the phase of the inverter. FIG. 4 is a schematic diagram of sinusoidal pulse width modulation. As shown in FIG. 4, in sinusoidal pulse width modulation, the controller may use a sine wave as a modulated wave signal, and use an isosceles triangular wave as a carrier wave signal. When the modulated wave signal intersects with the carrier wave signal, an intersection point of the modulated wave signal and the carrier wave signal determines an on/off moment of a switch component in the inverter. If a frequency of the modulated wave is changed, a frequency of an output voltage of the inverter is also changed. If an amplitude of the modulated wave signal is reduced, an amplitude of the output voltage of the inverter is also reduced accordingly. When a phase of the carrier wave signal is adjusted, a circulation current of the inverter is also changed.

The controller may be a general-purpose central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. Alternatively, the processor may be a combination of processors implementing a computing function. For example, the controller may include a combination of one or more microprocessors, or a combination of a DSP and a microprocessor. The controller may detect a high-frequency circulation current of the inverter. In addition, the controller may further include an analog-to-digital converter (ADC), configured to convert an analog quantity input by the inverter into a digital quantity.

In this application, after each inverter in the photovoltaic system inverts a direct current into an alternating current based on a received carrier wave signal, a flowing current (circulation current) is generated between the inverters, and the current does not flow to a power grid. Because of existence of the circulation current, normal operation of the inverter in the photovoltaic system is affected. Therefore, the controller may obtain first output currents of the plurality of inverters in each adjustment period, where the first output current is obtained by sampling an output current of the inverter at a specified sampling frequency, and the specified sampling frequency is greater than a frequency of a carrier wave signal of the inverter. Because the circulation current is a flowing current generated between the inverters, a manner of sampling the current of the inverter at a frequency higher than that of the carrier wave signal can better reflect a magnitude of the circulation current of the inverter. The controller determines, based on the first output currents of the plurality of inverters, an inverter with a largest first output current valid value in the inverters as a first target inverter; and adjusts a phase of a carrier wave signal of the first target inverter. The phase of the carrier wave signal of the first target inverter is adjusted, so that the carrier wave signal of the first target inverter can be more synchronized with a phase of another inverter. This can implement closed-loop suppression for a circulation current in the photovoltaic system.

Figure 5:
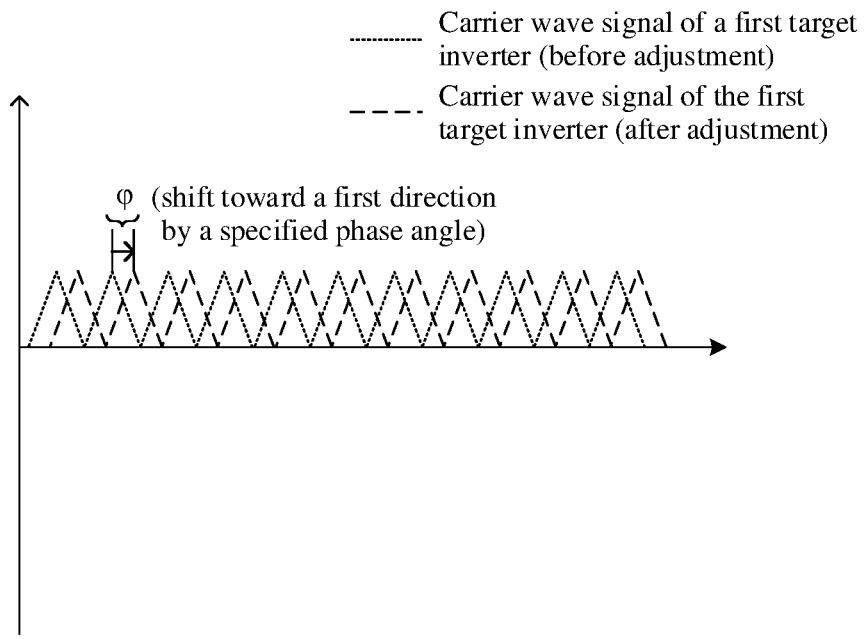
FIG. 5 is a schematic diagram of adjusting a phase of a carrier wave signal.

To further simplify a carrier wave signal adjustment step, in a possible implementation, the controller is specifically configured to shift the carrier wave signal of the first target inverter toward a first direction by a specified phase angle. FIG. 5 is a schematic diagram of adjusting a phase of a carrier wave signal. The first direction may be a direction prior to the phase of the original carrier wave signal, or a direction lagging behind the phase of the original carrier wave signal, and the specified phase angle value may be a fixed phase angle value or a phase angle value with a specified proportion. As shown in FIG. 5, the controller is configured to adjust the carrier wave signal of the first target inverter toward the first direction by the specified phase angle, to adjust the carrier wave signal of the first target inverter.

To ensure that a circulation current of the first target inverter decreases after the phase adjustment, in a possible implementation, the controller is further configured to perform at least one time of phase correction on the carrier wave signal of the first target inverter after shifting the carrier wave signal of the first target inverter toward the first direction by the specified phase angle, where any time of phase correction includes:

obtaining second output currents of the plurality of inverters, where a second output current of any inverter is obtained by sampling the output current of the inverter at the specified sampling frequency; obtaining second output current valid values of the plurality of inverters based on the second output currents of the plurality of inverters; determining a second target inverter in the plurality of inverters; and when the second target inverter is the same as the first target inverter, if a second output current valid value of the first target inverter is greater than or equal to the first output current valid value of the first target inverter, shifting the carrier wave signal of the first target inverter toward a second direction by the specified phase angle, where the second direction is an opposite direction of the first direction; or if a second output current valid value of the first target inverter is less than the first output current valid value of the first target inverter, continuing to shift the carrier wave signal of the first target inverter toward the first direction by the specified phase angle.

Optionally, after performing phase shift on the carrier wave signal of the first target inverter, the controller cannot learn whether the first direction is correct. Therefore, phase correction may be performed after phase adjustment is performed on the carrier wave signal of the first target inverter. Optionally, the controller may obtain the second output currents of the plurality of inverters. The second output current of any inverter is obtained by sampling the output current of the inverter at the specified sampling frequency. Whether the first direction for adjustment is correct is learned by determining a value relationship between the first output current valid value of the first target inverter and the second output current valid value of the first target inverter through comparison. After a second output current of the first target inverter is determined, the following three cases may occur.

In a first case, the first output current valid value of the first target inverter is greater than the second output current valid value of the first target inverter. This case indicates that the second output current valid value of the first target inverter is greater than the first output current valid value because the first direction is incorrect. Therefore, in this case, the carrier wave signal needs to be shifted toward the second direction, that is, the opposite direction of the first direction, to avoid a continuous increase of the circulation current of the first target inverter.

In a second case, the first output current valid value of the first target inverter is less than the second output current valid value of the first target inverter, but the second output current valid value of the first target inverter is still the largest in the inverters. This case indicates that the first direction is correct, but shift toward the first direction by the specified phase angle still needs to be performed, to reduce the circulation current of the first target inverter.

In a third case, the first output current valid value of the first target inverter is less than the second output current valid value of the first target inverter, and the second output current valid value of the first target inverter is not the largest in the inverters. In this case, phase calibration for the first target inverter is temporarily completed, and a new first target inverter needs to be determined, to reduce an overall high-frequency circulation current in the entire photovoltaic system.

To obtain the first output current of the first target inverter, in some possible implementations, the photovoltaic system includes a plurality of current detection circuits, the plurality of current detection circuits are in a one-to-one correspondence with the plurality of inverters, and each current detection circuit is coupled to a corresponding inverter.

Figure 6:
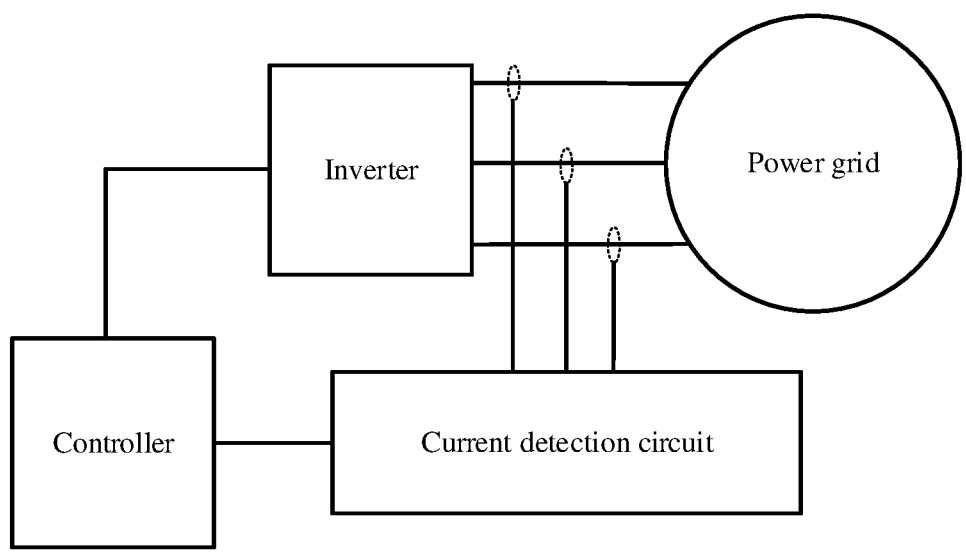
FIG. 6 is a schematic diagram of a structure of a current detection circuit.

A current detection circuit corresponding to any inverter is configured to sample the output current of the inverter at the specified sampling frequency in the adjustment period, to obtain the first output current of the inverter. When obtaining the first output currents of the plurality of inverters, the controller is specifically configured to obtain the first output currents that are of the plurality of inverters and that are sampled by the plurality of current detection circuits. FIG. 6 is a schematic diagram of a structure of a current detection circuit. As shown in FIG. 6, the current detection circuit may include a current transformer (CT). The current transformer is an instrument for converting a primary-side large current into a secondary-side small current according to an electromagnetic induction principle for measurement. The current transformer includes a closed iron core and a winding. A quantity of turns of a primary-side winding of the current transformer is small. The winding is bunched in a line of a current that needs to be measured, to sleeve the current transformer on an output cable of the inverter. A current of the output cable is detected according to an electromagnetic mutual inductance principle. Specifically, a magnetic field is generated around the output cable. After the current transformer is sleeved on the output cable, a coil on the current transformer generates an induced current due to the magnetic field of the output cable. After the induced current is amplified, the output cable current may be obtained.

In addition, after obtaining the output cable current, the current detection circuit further needs to perform filtering processing on the output cable current, to obtain the first output current. Optionally, the current detection circuit may extract a high-frequency circulation current component (the first output current) in the output cable current through hardware filtering (by using a high-pass filter), software filtering, or the like.

For example, the current detection circuit may sample an X-phase current of the inverter by using a sampling frequency that is K times (K≥4) the frequency of the carrier wave signal, to finally obtain K sampling values $i_{X1}$, $i_{X2}$, $i_{X3}$, ..., and $i_{XK}$ of the X-phase current of the inverter in a switching period; and calculate an average value $i_{Xavg}$ of $i_{X1}$, $i_{X2}$, $i_{X3}$, ..., and $i_{=XK}$, to determine a first output current valid value $i_{Xrms}$ of the X-phase current of the inverter. K and N are positive integers, and the first output current valid value $i_{Xrms}$ may be calculated by using the following formula:

$$i_{Xrms} = \frac{1}{K}\sqrt{\sum_{j=1}^{K} i_{xl}^2}$$

A largest value or an average value of high-frequency circulation current valid values in currents of phases of the inverter is used as a high-frequency circulation current valid value of the inverter.

In some possible implementations, the controller is further configured to: generate a carrier wave signal of each inverter based on a power grid voltage; and send the carrier wave signal of each inverter to the corresponding inverter.

Optionally, because a plurality of inverters in a multi-parallel system are connected to a power grid in series or in parallel, the controller in the photovoltaic system may detect the power grid voltage, to implement carrier wave synchronization.

In some possible implementations, when generating the carrier wave signal of each inverter based on the power grid voltage, the controller is specifically configured to: determine an initial phase of the carrier wave signal based on a zero-crossing point or a phase value of the power grid voltage; and generate, based on the initial phase of the carrier wave signal, the carrier wave signal corresponding to each inverter. Optionally, in a phase locking manner, a frequency of the power grid voltage may be followed, to determine when the power grid voltage crosses zero. After determining the zero-crossing point of the power grid voltage, the controller generates the carrier wave signal by using the zero-crossing point of the power grid voltage as a start phase. Because the power grid voltage is usually a sine wave, a phase of the power grid voltage is detected, and when determining that the phase of the power grid voltage is $\pi$ or $2\pi$, the controller generates the carrier wave signal by using the determining moment as a start phase.

Figure 7:
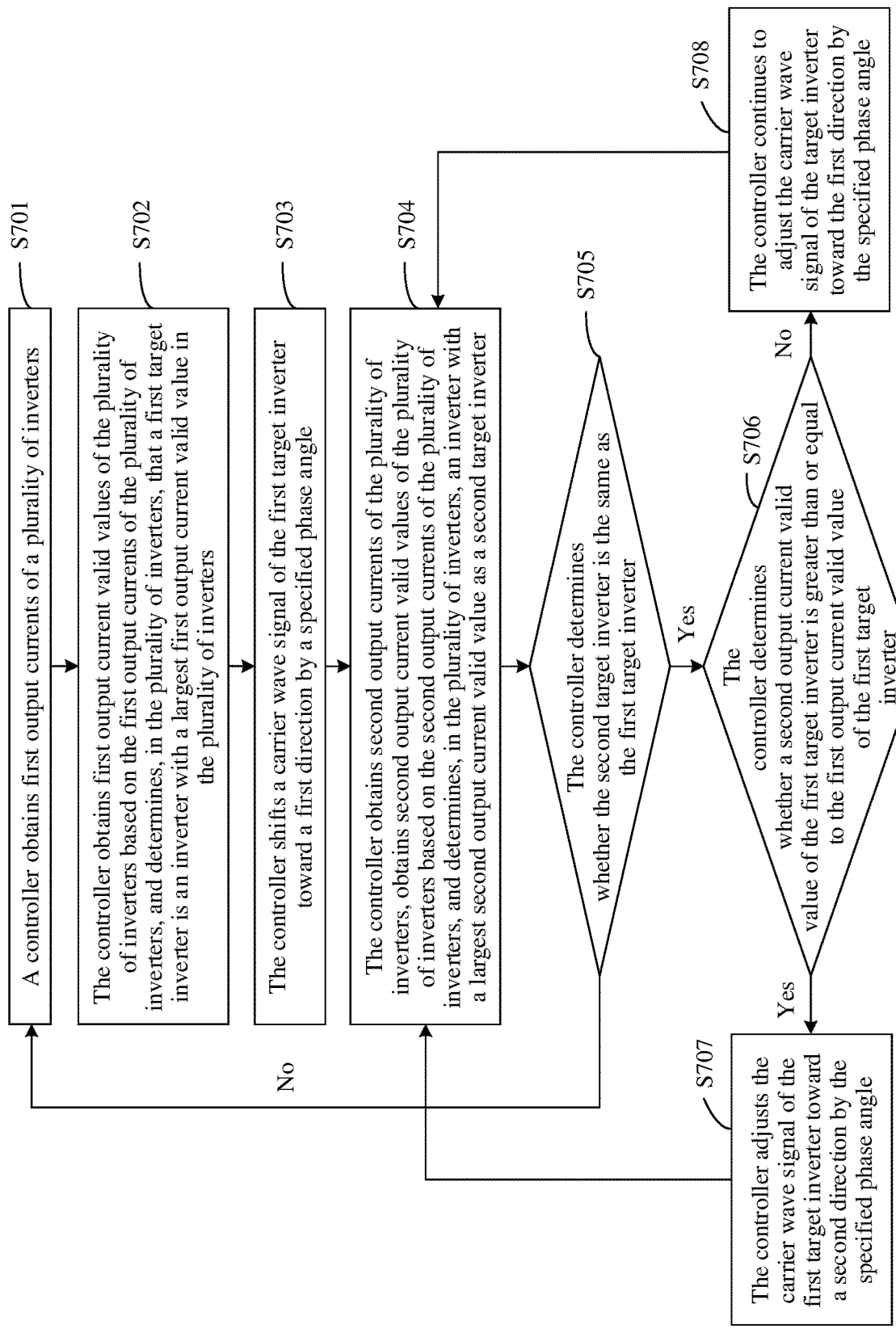
FIG. 7 is a schematic flowchart of an instance applied to a photovoltaic system.

For example, this application provides an instance of performing carrier wave signal synchronization on a plurality of inverters in a photovoltaic system. As shown in FIG. 7, a controller in the photovoltaic system may perform the following steps, to implement carrier wave signal synchronization of the plurality of inverters and suppress a circulation current between the inverters.

Step S701: The controller obtains first output currents of the plurality of inverters.

Step S702: The controller obtains first output current valid values of the plurality of inverters based on the first output currents of the plurality of inverters, and determines, in the plurality of inverters, that a first target inverter is an inverter with a largest first output current valid value in the plurality of inverters.

Step S703: The controller shifts a carrier wave signal of the first target inverter toward a first direction by a specified phase angle.

Step S704: The controller obtains second output currents of the plurality of inverters, obtains second output current valid values of the plurality of inverters based on the second output currents of the plurality of inverters, and determines, in the plurality of inverters, an inverter with a largest second output current valid value as a second target inverter.

Step S705: The controller determines whether the second target inverter is the same as the first target inverter, and performs step S706 if the second target inverter is the same as the first target inverter, or performs step S701 if the second target inverter is not the same as the first target inverter.

Step S706: The controller determines whether a second output current valid value of the first target inverter is greater than or equal to the first output current valid value of the first target inverter, and performs step S707 if the second output current valid value of the first target inverter is greater than or equal to the first output current valid value of the first target inverter, or performs step S708 if the second output current valid value of the first target inverter is not greater than or equal to the first output current valid value of the first target inverter.

Step S707: The controller adjusts the carrier wave signal of the first target inverter toward a second direction by the specified phase angle.

Step S708: The controller continues to adjust the carrier wave signal of the target inverter toward the first direction by the specified phase angle.

This application further provides a carrier wave signal synchronization method, applied to a controller in a photovoltaic system. The photovoltaic system further includes a plurality of inverters, and each inverter is configured to: invert a direct current into an alternating current based on a received carrier wave signal, and transmit the alternating current to a power grid. The method includes:

obtaining first output currents of the plurality of inverters in an adjustment period, where a first output current of any inverter is obtained by sampling an output current of the inverter at a specified sampling frequency, and the specified sampling frequency is greater than a frequency of a carrier wave signal of the inverter; obtaining first output current valid values of the plurality of inverters based on the first output currents of the plurality of inverters; and adjusting a phase of a carrier wave signal of a first target inverter, where the first target inverter is an inverter with a largest first output current valid value in the plurality of inverters.

In some possible implementations, the adjusting a phase of a carrier wave signal of a first target inverter includes:

shifting the carrier wave signal of the first target inverter toward a first direction by a specified phase angle.

In some possible implementations, the method further includes:

performing at least one time of phase correction on the carrier wave signal of the first target inverter after shifting the carrier wave signal of the first target inverter toward the first direction by the specified phase angle, where any time of phase correction includes: obtaining second output currents of the plurality of inverters, where a second output current of any inverter is obtained by sampling the output current of the inverter at the specified sampling frequency; obtaining second output current valid values of the plurality of inverters based on the second output currents of the plurality of inverters; and when a second target inverter is the same as the first target inverter, if a second output current valid value of the first target inverter is greater than or equal to the first output current valid value of the first target inverter, shifting the carrier wave signal of the first target inverter toward a second direction by the specified phase angle, where the second direction is an opposite direction of the first direction; or if a second output current valid value of the first target inverter is less than the first output current valid value of the first target inverter, continuing to shift the carrier wave signal of the first target inverter toward the first direction by the specified phase angle.

In some possible implementations, the photovoltaic system further includes a plurality of current detection circuits, the plurality of current detection circuits are in a one-to-one correspondence with the plurality of inverters, and each current detection circuit is coupled to a corresponding inverter; and the obtaining first output currents of the plurality of inverters includes: obtaining a first output current that is obtained by each current detection circuit by sampling an output current of the corresponding inverter at the specified sampling frequency and that is of the inverter.

In some possible implementations, the method further includes:

generating a carrier wave signal of each inverter based on a power grid voltage; and
sending the carrier wave signal of each inverter to the corresponding inverter.

In some possible implementations, the generating a carrier wave signal of each inverter based on a power grid voltage includes:

determining an initial phase of the carrier wave signal based on a zero-crossing point or a phase value of the power grid voltage; and
generating, based on the initial phase of the carrier wave signal, the carrier wave signal corresponding to each inverter.

In addition, the carrier wave signal synchronization method in this application is not limited to being applied to the photovoltaic system, but may be further applied to a wind power generation system, a tidal power generation system, and the like. The carrier wave signal synchronization method provided in this application may be applied to any power supply/power generation scenario in which a plurality of inverters are connected in series or in parallel. A person skilled in the art should know this. For beneficial effects and possible implementations of the foregoing embodiment, refer to specific descriptions of the photovoltaic system in the foregoing embodiment. Details are not described herein again.

A person skilled in the art should understand that embodiments of this application may be provided as a method, a system, or a computer program product. Therefore, this application may be in a form of a hardware-only embodiment, a software-only embodiment, or an embodiment combining software and hardware aspects. In addition, this application may be in a form of a computer program product implemented on one or more computer-usable storage media (including but not limited to a magnetic disk memory, a CD-ROM, an optical memory, and the like) including computer-usable program code.

These computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto a computer or another programmable data processing device, so that a series of operations and steps are performed on the computer or the another programmable device, to generate computer-implemented processing. Therefore, the instructions executed on the computer or the another programmable device provide steps for implementing a specific function in one or more processes in the flowcharts and/or in one or more blocks in the block diagrams.

It is clear that a person skilled in the art may make various modifications and variations to this application without departing from the protection scope of this application. Thus, this application is intended to cover these modifications and variations, provided that they fall within the scope of the claims of this application and their equivalent technologies.

What is claimed is:

1. A system, comprising:
a plurality of inverters each configured to: invert a direct current into an alternating current based on a received carrier wave signal, and transmit the alternating current to a power grid; and a controller configured to:
  obtain first output currents of the plurality of inverters in an adjustment period, wherein a respective first output current of each inverter of the plurality of inverters is obtained by sampling an output current of a respective inverter at a specified sampling frequency that is greater than a frequency of a carrier wave signal of the respective inverter;
  obtain first output current valid values of the plurality of inverters based on the first output currents of the plurality of inverters; and
  adjust a phase of a target carrier wave signal of a first target inverter, wherein the first target inverter is an inverter with a largest first output current valid value of the plurality of inverters.

2. The system according to claim 1, wherein the controller is configured to adjust the phase of the target carrier wave signal of the first target inverter by:
  shifting the target carrier wave signal of the first target inverter toward a first direction by a specified phase angle.

3. The system according to claim 2, wherein the controller is further configured to:
  perform at least one time of phase correction on the carrier wave signal of the first target inverter after shifting the target carrier wave signal of the first target inverter toward the first direction by the specified phase angle, wherein each time of phase correction of the at least one time of phase correction comprises:
    obtaining second output currents of the plurality of inverters, wherein a respective second output current of each inverter of the plurality of inverters is obtained by sampling the output current of the respective inverter at the specified sampling frequency;
    obtaining second output current valid values of the plurality of inverters based on the second output currents of the plurality of inverters; and
    when a second target inverter is the same as the first target inverter, in response to a second output current valid value of the first target inverter being greater than or equal to a first output current valid value of the first target inverter, shifting the carrier wave signal of the first target inverter toward a second direction by the specified phase angle, wherein the second target inverter is an inverter with a largest second output current valid value of the plurality of inverters, and the second direction is an opposite direction of the first direction; or in response to the second output current valid value of the first target inverter being less than the first output current valid value of the first target inverter, continuing to shift the carrier wave signal of the first target inverter toward the first direction by the specified phase angle.

4. The system according to claim 1, wherein the system comprises a plurality of current detection circuits, the plurality of current detection circuits is in a one-to-one correspondence with the plurality of inverters, and each current detection circuit of the plurality of current detection circuits is coupled to a respective inverter of the plurality of inverters and is configured to sample the output current of the respective inverter at the specified sampling frequency in the adjustment period, to obtain a respective first output current of the respective inverter; and
  when obtaining the first output currents of the plurality of inverters, the controller is specifically configured to:
    obtain the first output currents that are of the plurality of inverters and that are sampled by the plurality of current detection circuits.

5. The system according to claim 1, wherein the controller is further configured to:
  generate a carrier wave signal of each inverter of the plurality of inverters based on a power grid voltage; and
  send the carrier wave signal of each inverter of the plurality of inverters to a respective inverter.

6. The system according to claim 5, wherein when generating the carrier wave signal of each inverter of the plurality of inverters based on the power grid voltage, the controller is specifically configured to:
  determine an initial phase of the carrier wave signal based on a zero-crossing point or a phase value of the power grid voltage; and
  generate, based on the initial phase of the carrier wave signal, the carrier wave signal respective to each inverter of the plurality of inverters.

7. A method, applied to a controller in a photovoltaic system, wherein the photovoltaic system further comprises a plurality of inverters, and the method comprises:
  obtaining first output currents of the plurality of inverters in an adjustment period, wherein a respective first output current of each inverter of the plurality of inverters is obtained by sampling an output current of a respective inverter at a specified sampling frequency that is greater than a frequency of a carrier wave signal of the respective inverter;
  obtaining first output current valid values of the plurality of inverters based on the first output currents of the plurality of inverters; and
  adjusting a phase of a carrier wave signal of a first target inverter, wherein the first target inverter is an inverter with a largest first output current valid value of the plurality of inverters.

8. The method according to claim 7, wherein adjusting the phase of the carrier wave signal of the first target inverter comprises:
  shifting the carrier wave signal of the first target inverter toward a first direction by a specified phase angle.

9. The method according to claim 8, wherein the method further comprises:
  performing at least one time of phase correction on the carrier wave signal of the first target inverter after shifting the carrier wave signal of the first target inverter toward the first direction by the specified phase angle, wherein each time of phase correction of the at least one time of phase correction comprises:
    obtaining second output currents of the plurality of inverters, wherein a respective second output current of each inverter of the plurality of inverters is obtained by sampling the output current of the respective inverter at the specified sampling frequency;
    obtaining second output current valid values of the plurality of inverters based on the second output currents of the plurality of inverters; and
    when a second target inverter is the same as the first target inverter, in response to a second output current valid value of the first target inverter being greater than or equal to a first output current valid value of the first target inverter, shifting the carrier wave signal of the first target inverter toward a second direction by the specified phase angle, wherein the second target inverter is an inverter with a largest second output current valid value of the plurality of inverters, and the second direction is an opposite direction of the first direction or in response to the second output current valid value of the first target inverter being less than the first output current valid value of the first target inverter, continuing to shift the carrier wave signal of the first target inverter toward the first direction by the specified phase angle.

10. The method according to claim 7, wherein the photovoltaic system further comprises a plurality of current detection circuits, the plurality of current detection circuits is in a one-to-one correspondence with the plurality of inverters, and each current detection circuit of the plurality of current detection circuits is coupled to a respective inverter of the plurality of inverters; and obtaining the first output currents of the plurality of inverters comprises obtaining the first output currents that are of the plurality of inverters and that are sampled by the plurality of current detection circuits.

11. The method according to claim 7, wherein the method further comprises:

generating a carrier wave signal of each inverter of the plurality of inverters based on a power grid voltage; and sending the carrier wave signal of each inverter of the plurality of inverters to a respective inverter.

12. The method according to claim 11, wherein generating the carrier wave signal of each inverter of the plurality of inverters based on the power grid voltage comprises:

determining an initial phase of the carrier wave signal based on a zero-crossing point or a phase value of the power grid voltage; and generating, based on the initial phase of the carrier wave signal, the carrier wave signal respective to each inverter of the plurality of inverters.

13. A system, comprising:

a controller configured to:

obtain first output currents of a plurality of inverters in an adjustment period, wherein a respective first output current of each inverter of the plurality of inverters is obtained by sampling an output current of a respective inverter at a specified sampling frequency that is greater than a frequency of a carrier wave signal received by the respective inverter;

obtain first output current valid values of the plurality of inverters based on the first output currents of the plurality of inverters; and adjust a phase of a target carrier wave signal of a first target inverter, wherein the first target inverter is an inverter with a largest first output current valid value of the plurality of inverters.

14. The system according to claim 13, wherein the controller is configured to adjust the phase of the target carrier wave signal of the first target inverter by:

shifting the target carrier wave signal of the first target inverter toward a first direction by a specified phase angle.

15. The system according to claim 14, wherein the controller is further configured to:

perform at least one time of phase correction on the carrier wave signal of the first target inverter after shifting the target carrier wave signal of the first target inverter toward the first direction by the specified phase angle, wherein each time of phase correction of the at least one time of phase correction comprises:

obtaining second output currents of the plurality of inverters, wherein a respective second output current of each inverter of the plurality of inverters is obtained by sampling the output current of the respective inverter at the specified sampling frequency;

obtaining second output current valid values of the plurality of inverters based on the second output currents of the plurality of inverters; and when a second target inverter is the same as the first target inverter, in response to a second output current valid value of the first target inverter being greater than or equal to the first output current valid value of the first target inverter, shifting the carrier wave signal of the first target inverter toward a second direction by the specified phase angle, wherein the second target inverter is an inverter with a largest second output current valid value of the plurality of inverters, and the second direction is an opposite direction of the first direction; or in response to the second output current valid value of the first target inverter being less than the first output current valid value of the first target inverter, continuing to shift the carrier wave signal of the first target inverter toward the first direction by the specified phase angle.

16. The system according to claim 13, wherein the system comprises a plurality of current detection circuits, the plurality of current detection circuits is in a one-to-one correspondence with the plurality of inverters, and each current detection circuit of the plurality of current detection circuits is coupled to a respective inverter of the plurality of inverters and is configured to sample the output current of the respective inverter at the specified sampling frequency in the adjustment period, to obtain a respective first output current of the respective inverter; and when obtaining the first output currents of the plurality of inverters, the controller is specifically configured to:

obtain the first output currents that are of the plurality of inverters and that are sampled by the plurality of current detection circuits.

17. The system according to claim 13, wherein the controller is further configured to:

generate a carrier wave signal of each inverter of the plurality of inverters based on a power grid voltage; and send the carrier wave signal of each inverter of the plurality of inverters to a respective inverter.

18. The system according to claim 17, wherein when generating the carrier wave signal of each inverter of the plurality of inverters based on the power grid voltage, the controller is specifically configured to:

determine an initial phase of the carrier wave signal based on a zero-crossing point or a phase value of the power grid voltage; and generate, based on the initial phase of the carrier wave signal, the carrier wave signal respective to each inverter of the plurality of inverters.

19. The system according to claim 13, wherein each inverter of the plurality of inverters is configured to invert a direct current into an alternating current based on the carrier wave signal received by the respective inverter.

* * * * *